(12) United States Patent
Boivie (10) Patent No.: US 7,079,501 B2
(45) Date of Patent: Jul. 18, 2006

(54) METHOD AND SYSTEM FOR EFFICIENTLY DELIVERING CONTENT TO MULTIPLE REQUESTERS

(75) Inventor: Richard H. Boivie, Monroe, CT (US)

(73) Assignee: International Business Machines Corporation, Armonk, NY (US)

(*) Notice: Subject to any disclaimer, the term of this patent is extended or adjusted under 35 U.S.C. 154(b) by 931 days.

(21) Appl. No.: 09/774,505

(22) Filed: Jan. 31, 2001

(65) Prior Publication Data

US 2002/0101872 A1    Aug. 1, 2002

(51) Int. Cl.
   *H04J 3/24* (2006.01)
(52) U.S. Cl. .................. 370/312; 370/338; 370/389; 370/432; 370/473; 709/203
(58) Field of Classification Search .......... 370/312, 370/338, 349, 389, 390, 392, 393, 432, 473; 709/203
   See application file for complete search history.

(56) References Cited

U.S. PATENT DOCUMENTS

| | | | | |
|---|---|---|---|---|
| 5,612,959 A * | 3/1997 | Takase et al. | ............... | 370/390 |
| 5,771,352 A * | 6/1998 | Nakamura et al. | .......... | 709/227 |
| 6,181,697 B1 * | 1/2001 | Nurenberg et al. | ......... | 370/390 |
| 6,351,467 B1 * | 2/2002 | Dillon | .................. | 370/432 |
| 6,389,031 B1 * | 5/2002 | Chao et al. | ................. | 370/412 |
| 6,389,453 B1 * | 5/2002 | Willis | ....................... | 709/204 |
| 6,415,312 B1 * | 7/2002 | Boivie | ........................ | 709/200 |
| 6,512,776 B1 * | 1/2003 | Jones et al. | ................. | 370/432 |
| 6,717,944 B1 * | 4/2004 | Bryden et al. | ............. | 370/392 |
| 6,754,207 B1 * | 6/2004 | Hesse | ......................... | 370/388 |
| 6,757,294 B1 * | 6/2004 | Maruyama | ................. | 370/432 |
| 6,836,481 B1 * | 12/2004 | Hotta | ......................... | 370/392 |
| 6,862,279 B1 * | 3/2005 | Imai et al. | ................. | 370/390 |
| 6,873,618 B1 * | 3/2005 | Weaver | ...................... | 370/390 |

* cited by examiner

*Primary Examiner*—Steven Nguyen
*Assistant Examiner*—Roberta A. Shand
(74) *Attorney, Agent, or Firm*—Casey P. August; Jose Gutman; Fleit, Kain, Gibbons, Gutman, Bongini & Bianco P.L.

(57) ABSTRACT

An Internet communication technique is provided for making efficient use of available bandwidth between network points by analyzing responses to received requests for information items to identify multiple responses that include the same item and optionally that also have a common next hop address, and responding to the multiple requests with a combined packet addressed to multiple addresses. The combined packets include sufficient information from which to generate reliable unicast packets, that will ultimately be formed from the contents of the combined packet. The combined packet is received by a network router identified by a common next hop address, and a sequence of addresses are associated in sub-groups corresponding to common next hop addresses. A plurality of packets are generated based on the combined packet, each of which includes addresses that correspond to destinations that share a common next hop address. The plurality of packets are then sent to their corresponding next hop addresses.

33 Claims, 7 Drawing Sheets

METHOD AND SYSTEM FOR EFFICIENTLY DELIVERING CONTENT TO MULTIPLE REQUESTERS

FIELD OF THE INVENTION

The invention pertains to a system and method for efficiently delivering content to multiple requesters over a communications network. The invention is especially suited to delivery of web content.

BACKGROUND OF THE INVENTION

Since its inception, the defining paradigm of the World Wide Web (WWW) has been the ability to distribute content to a user on demand rather than limiting the user to pre-programmed content as in the case of traditional broadcast media (e.g., television, radio). In an effort to provide the ability to distribute high bandwidth media, such as video, efficiently there has been an effort to develop multicasting protocols for the Internet. Today's multicast solutions are directed at live event telecasting. Distribution of content on demand to individual users is very different and is not served by these conventional multicast solutions.

As the commercialization of the Internet progresses, situations arise where certain commercial or other web servers that serve information on an on-demand basis (e.g. Hyper Text Transfer Protocol (HTTP) servers) are bombarded with more hits than they are able to service, given the bandwidth of their connections to the Internet. Such situations may arise during periods of heightened interest in the subject matter web sites that the server is hosting. Under such circumstances it may be the case that there is excess CPU capacity in the server that is not being utilized to service client requests. In other words the bandwidth of the connection is the limiting factor, not the server processing power.

It would be desirable to be able to make more efficient use of the bandwidth of a connection between a server and the Internet, while still being able to service requests for information on-demand (as opposed to following a predetermined multicasting schedule).

What is needed is a system and method that allows a server to handle more requests without increasing the actual bandwidth of a connection between the server and the Internet.

BRIEF DESCRIPTION OF THE FIGURES

The features of the invention believed to be novel are set forth in the claims. The invention itself, however, may be best understood by reference to the following detailed description of certain exemplary embodiments of the invention, taken in conjunction with the accompanying drawings in which

DETAILED DESCRIPTION OF THE PREFERRED EMBODIMENTS

While this invention is susceptible to embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Figure 1:
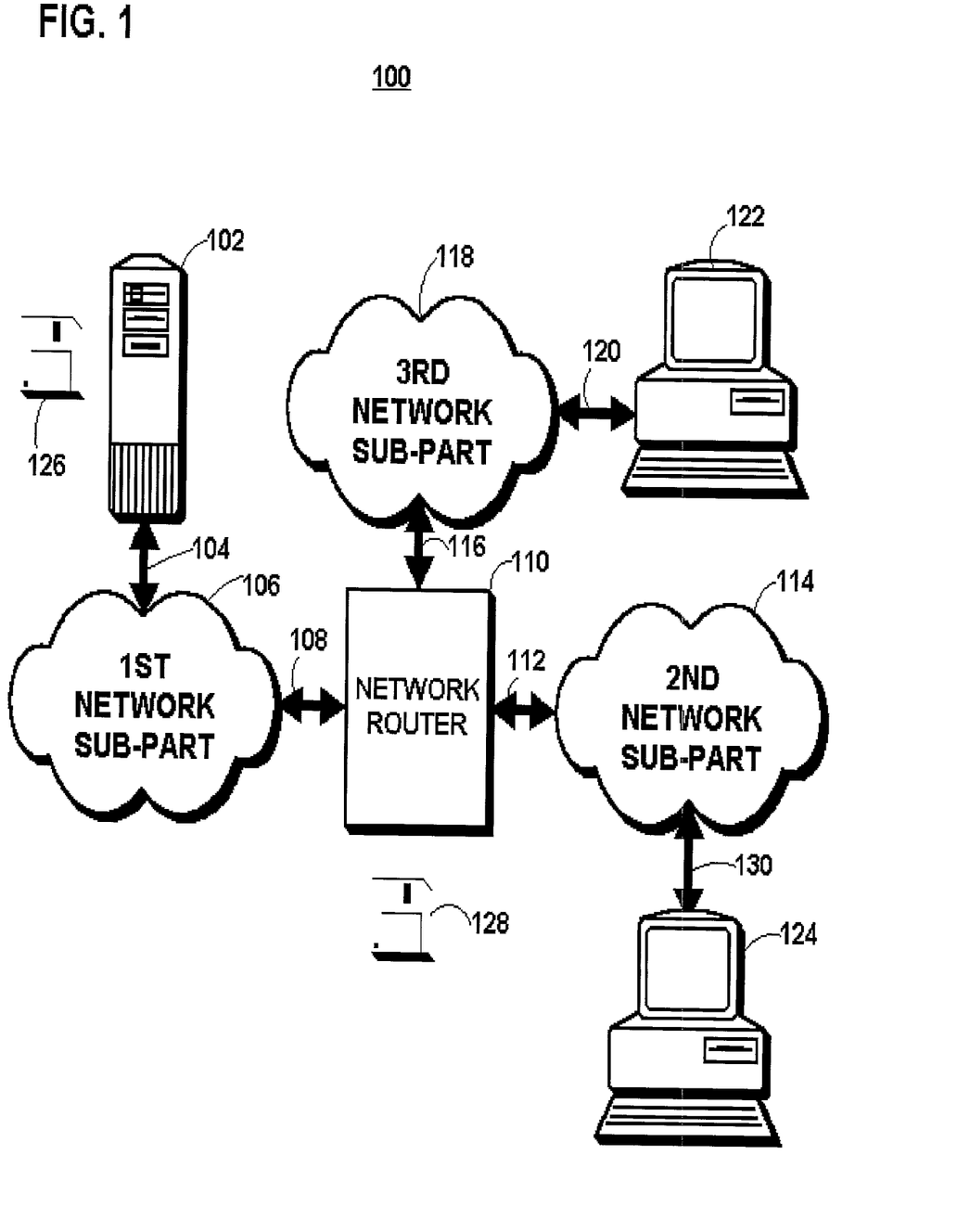
FIG. 1 is a schematic diagram of a computer network according to a preferred embodiment of the invention.

FIG. 1 is schematic diagram of a computer network 100 according to a preferred embodiment of the invention. The network 100 includes a server 102 communicatively coupled to a first network sub-part 106 through a first bi-directional data link 104. The first network sub-part 106 can for example comprise an ethernet local area network or a T1 line. The server 102 preferably comprises a web server. A first computer readable medium 126 is provided for loading software onto the server 102 for configuring it to carry out processes described below with reference to flow diagrams shown in the FIGS. The first computer readable medium can for example take the form of an optical disk.

The first network sub-part 106 is communicatively coupled via a second bi-directional data link 108 to a network router 110. A second computer readable medium 128 is provided for loading software onto the network router for configuring it to carry out processes described with reference to flow diagrams shown in the FIGS. The network router 110 is communicatively coupled to a second network sub-part 114, and a third network sub-part 118, through third and fourth bi-directional data links 112, and 116 respectively.

The second network sub-part 114 is communicatively coupled to a first client computer 124 through a fifth bi-directional data link 130. The third network sub-part is communicatively coupled to a second client computer 122 through a sixth bi-directional data link 120.

The server 102, first client computer 124, and second client computer 122 can for example comprise IBM PC compatible computers. IBM PC compatible computers include a microprocessor, Random Access Memory (RAM), Basic Input Output System Read Only Memory (BIOS-ROM), video driver card, network interface (e.g. an ethernet interface or a modem), removable memory media reader (e.g. CD-ROM drive) electrically coupled through a digital signal bus. The first and second client computers 124, and 122 are loaded with web client software such as the Netscape Navigator web browser manufactured by America Online of Dulles, Va.

FIG. 1 is merely illustrative of a simplified network topology. An actual network with which the present invention will be useful may include a multiplicity of network routers, numerous sub-networks, servers, and clients.

Figure 2:
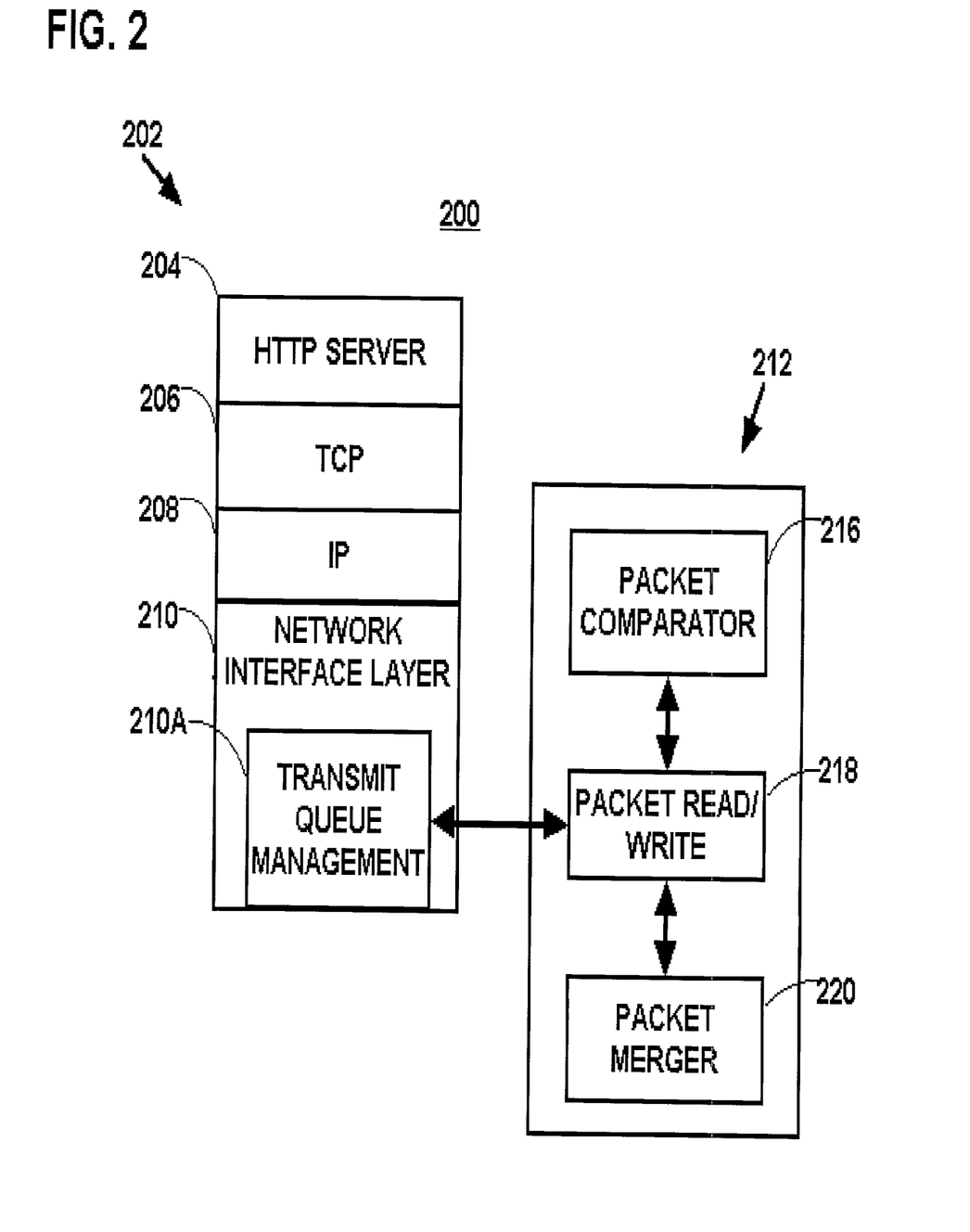
FIG. 2 is a schematic of web server software interrelationships according to a preferred embodiment of the invention.

FIG. 2 is a schematic of exemplary web server software 200 interrelationships according to a preferred embodiment of the invention. The web server software 200 includes a communication protocol stack 202. The communication protocol stack, as shown, includes an HTTP server application 204 at the top of the stack 202.

A significant advantage of the present invention is that the invention, according to one preferred embodiment, supports communication with a conventional HTTP server application 204. The present invention therefore is compatible with existing HTTP server applications without having to change the software and/or operation of conventional HTTP server applications.

The HTTP server application 204, as shown in the example of FIG. 2, is interfaced to a transmission control protocol (TCP) layer 206. The TCP layer 206 is interfaced to an Internet Protocol (IP) layer 208. The TCP layer 206 and IP layer 208 may be combined into a single software module. The IP layer 208 is interfaced to a network interface layer 210, e.g., an Ethernet layer. The network interface layer 210 may include software that runs on a network interface card that is included in the server 102 (see FIG. 1). The network interface layer 210 includes a transmit queue management module 210A. A transmit queue that is stored in a memory included in the server 102 is used to queue responses to web client requests until bandwidth is available to transmit the responses through the first network sub-part 106. If the web server 102 receives client requests at a high rate or if the responses are large in size, the queue will increase in size, and responses to client requests will be delayed. The present invention reduces those delays.

A server response condenser module 212 includes a packet read/write module 218, a packet comparator 216, and a packet merger 220. The packet read/write module 218 reads and writes packets to the transmit queue through the transmit queue management module 210A. The packet comparator 216 compares the content of two or more packets to be transmitted that are read by the packet read/write module 218. The packet merger 220 merges two or more packets that are determined to have common content payload by the packet comparator 216 into a single packet. The operations will be described in greater detail below.

The single packet produced by the packet merger 220 is passed by the packet read/write module 218 to the transmit queue management module 210A for placement on the transmit queue, and the packets that were merged are removed from the queue. By combining multiple packets that have the same content into a single packet, the size of the transmit queue can be significantly reduced, thereby reducing the delay in sending responses to web clients 122, and 124 and increasing the capacity of the server. The single packet preferably includes 1) a common content payload of the packets that were merged, 2) a list of at least one destination address identifying the destination(s) for the single packet, e.g., a list of addresses from the packets that were merged, and 3) additional information for each of the destinations that can be used to construct a packet of the type that the destinations are expecting. Preferably, this per destination additional information is TCP header information that can be used to construct a packet that can be handled by an ordinary unmodified web client, and TCP/IP stack. A preferred process by which these TCP/IP packets are generated will be described below in the description of FIG. 5.

The software interrelationships shown in FIG. 2 are merely illustrative of one possible arrangement that can be used in practicing the invention. The arrangement can be varied. Functionality can be combined in different software classes, modules, or subroutines, in different ways. The distribution of functions among different software modules is to some extent affected by the choice of programming language, and depends on prevailing trends in the computer programming art. Numerous alternative software arrangements are possible without departing from the true spirit and scope of the present invention.

Figure 3:
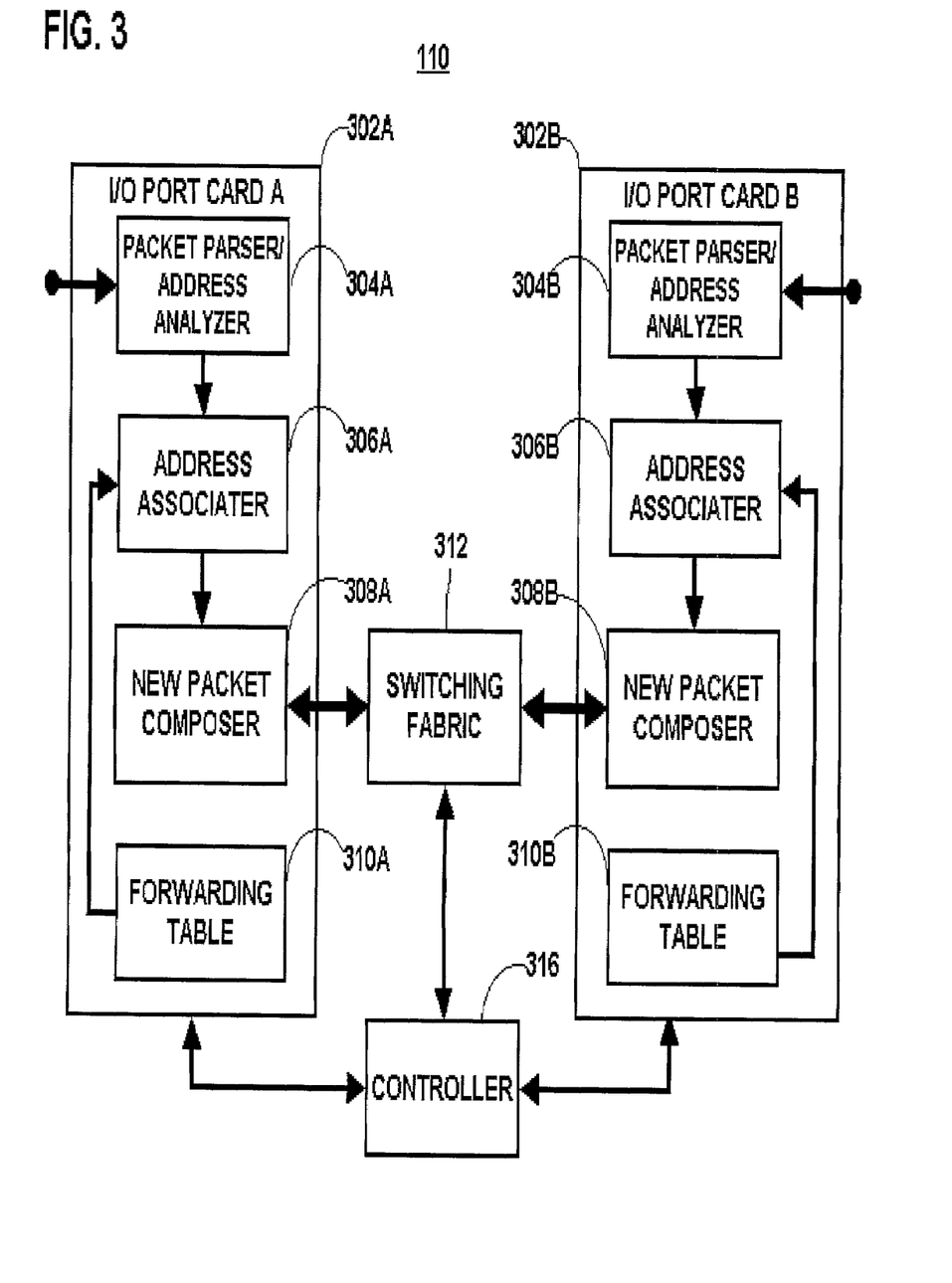
FIG. 3 is a block diagram of a network router according to a preferred embodiment of the invention.

FIG. 3 is a block diagram of an exemplary network router 110 according to a preferred embodiment of the invention. The router 110 includes a first input/output card 302A and a second input/output card 302B that are coupled to a switching fabric 312. In general, the router 110 may include a different number of input/output cards; two are shown in FIG. 2 for purposes of illustration in this example. The switching fabric 312 can for example be implemented as shared memory. Other types of switching fabric 312 are also known in the art. A controller 316 is communicatively coupled to the input/output cards 302A, 302B, and switching fabric 312, and serves to control the overall operation of the network router 110. Although each input/output card 302A, 302B, can perform both input and output functions, the functions to be performed in carrying out the present invention in the present example are performed when an input/output card receives a packet, i.e., when the input/output card is functioning as an input. Accordingly the block diagrams of the input/output cards 302A, 302B, shown in FIG. 3 highlight functional blocks involved in processing a received packet. The input/output cards 302A, 302B, can also include other parts, as known to one of ordinary skill in the router art.

Each input/output card 302A, 302B, includes a number of modules, as will presently be described, that can be implemented as hardware, software or using a combination of hardware and software. (Alternatively, one or more of these modules could be implemented in the controller 316.) A packet parser/address analyzer 304A, 304B, parses each packet to extract one or more addresses preferably more than one address, data, and optionally header data associated with each address. Address associater 306A, 306B, is communicatively coupled to the packet parser/address analyzer 304A, 304B, and to a forwarding table 310A, 310B. The forwarding table 310A, 310B, can be implemented as a table stored in a memory on the input/output port cards 302A, 302B. The forwarding table includes a plurality of records consisting of destination addresses, and corresponding next hop addresses. The address associater 306A, 306B, examines the one or more addresses parsed from a packet by the packet parser/address analyzer 304A, 304B, and associates together those addresses that are determined based on the forwarding table 310A, 310B, to have the same next hop address. New packet composers 308A, 308B, are communicatively coupled to respective address associaters 306A, 306B. The new packet composers 308A, 308B, compose one or more packets each of which includes at least one address that has been determined to correspond to the same next hop address by the address associater.

Consider the following illustrative example. A packet, that includes 10 different addresses, can be received by input/output card 302A. These are parsed by the packet parser/address analyzer 304A. It may so happen that five of these addresses are determined to correspond to a first next hop address, four to a second next hop address, and one to a third next hop address. In this case the new packet composer 308A will compose three new packets each of which includes the same data payload as the packet received by the input port card 302A. The first new packet will include the five addresses corresponding to the first next hop address, the second new packet will include the four addresses corresponding to the second next hop address, and the third new packet will include the address corresponding to the third next hop address. The new packets preferably also contain additional information that is parsed from the received packet and associated with the various addresses. More preferably, the new packets include TCP header information for each address in the new packets.

Figure 4A:
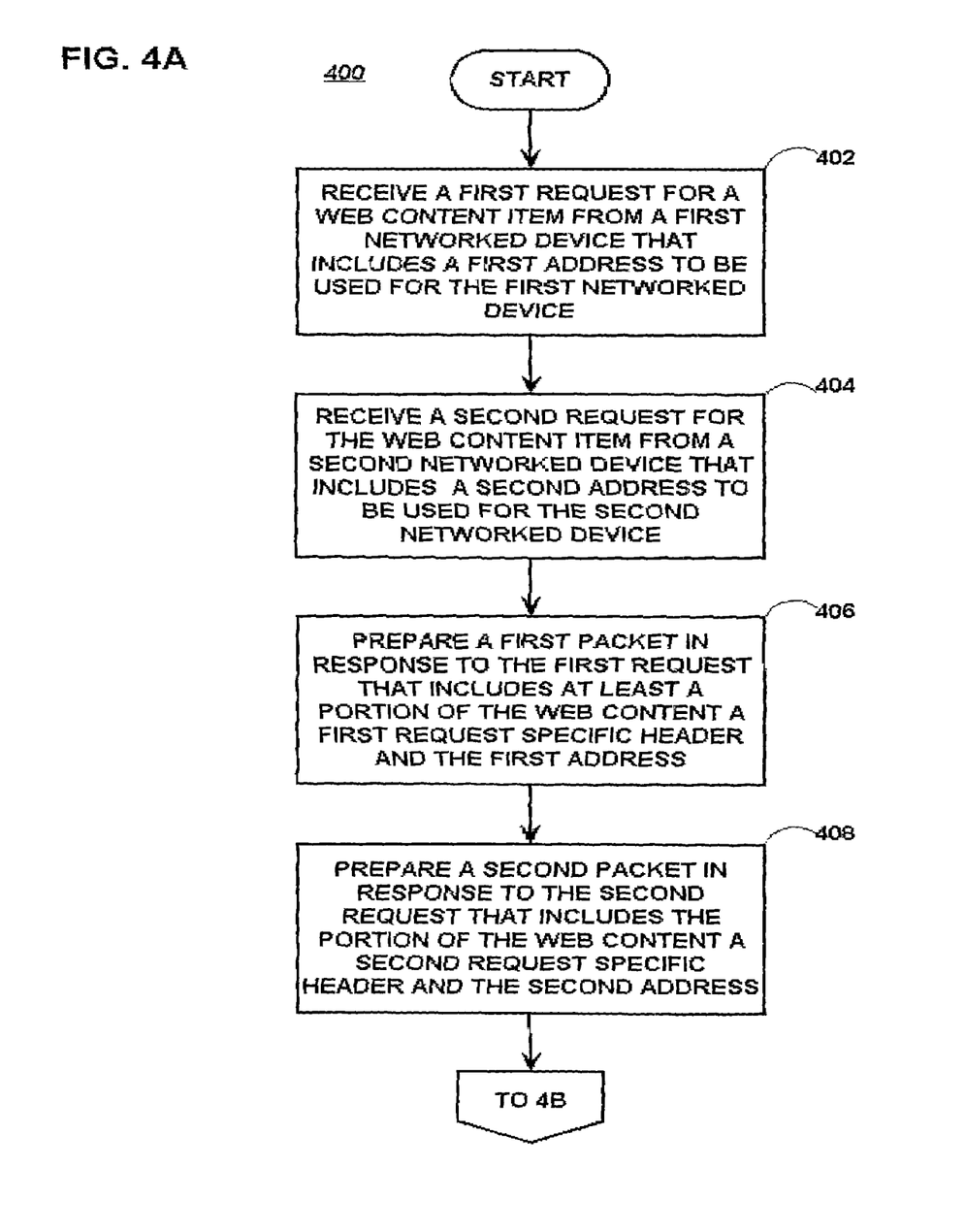
FIG. 4A is a first part of a flow diagram of a process performed by a web server according to a preferred embodiment of the invention.
Figure 4B:
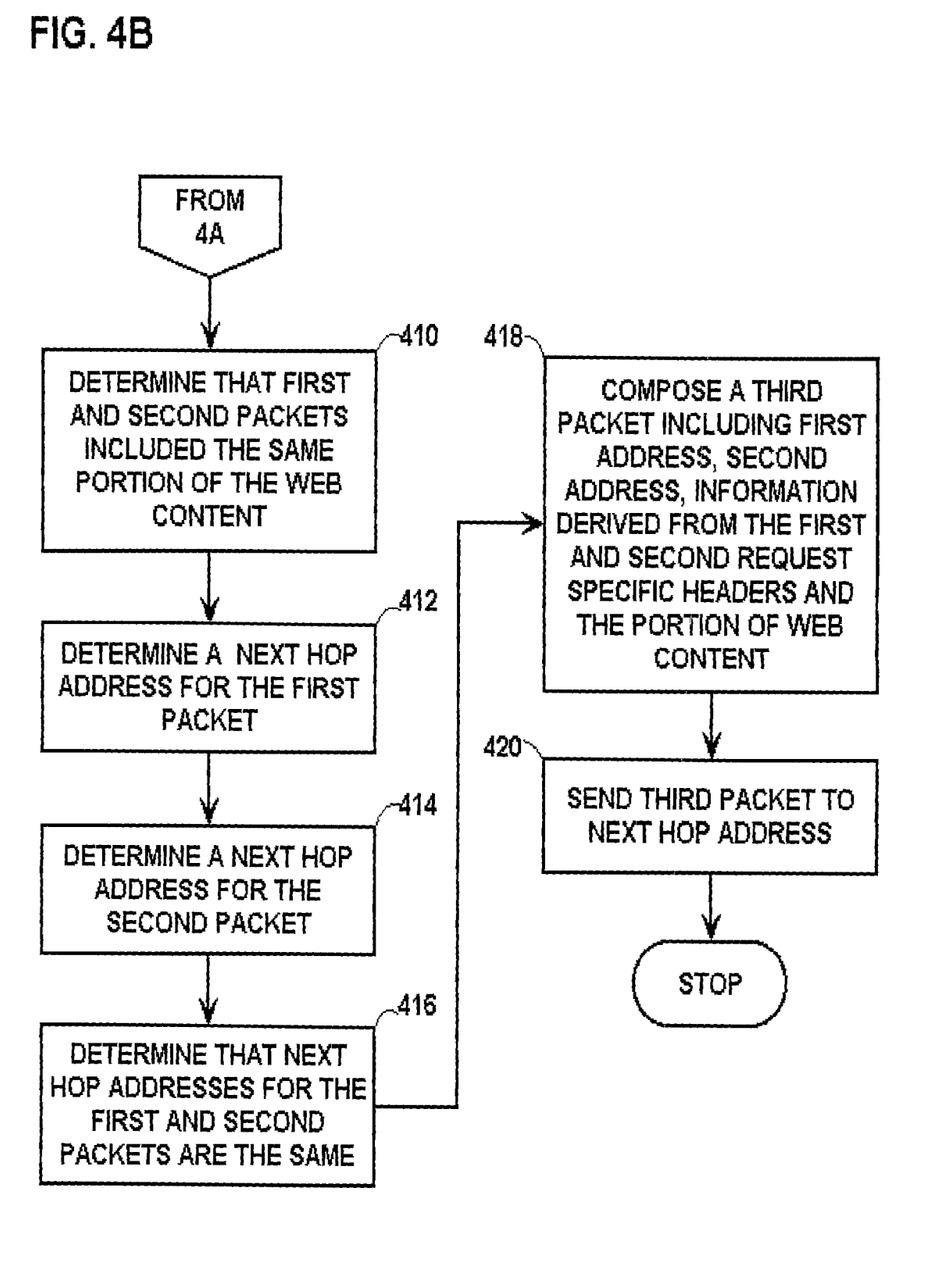
FIG. 4B is a continuation of the flow diagram shown in FIG. 4A.

FIG. 4A and FIG. 4B show a flow diagram of a process 400 performed by web server 102 (FIG. 1) according to a preferred embodiment of the present invention. In process block 402 a first request for a web content item is received by the server 102 from a first networked device (e.g., client 124). In process block 404 a request for the same web content item is received by the server 102 from a second networked device (e.g., client 122). The first and second requests preferably include network addresses to be used in transmitting a requested item to the first and second networked device 122, 124, respectively. These network addresses correspond to the identity of the first and second networked devices 122, 124. More preferably the included network addresses are, respectively, addresses that identify the first and second networked devices 122, 124, as destinations of packets distributed in the network.

The requests received in process blocks 402 and 404 preferably take the form of an HTTP request. The requests are preferably received by the HTTP server application 204 (see FIG. 2) through the communication protocol stack 202. The HTTP server application 204, in accordance with a preferred embodiment of the present invention, conventionally services the requests by creating packets for distribution in the network in response to the requests and passing the packets through the communication protocol stack 202. The packets are destined for reception in the network by the originators of the requests, e.g., the first and second networked devices 122, 124. The network interface layer 210 typically stores the packets in the transmit queue that is being managed by the transmit queue management module 210A. The transmit queue stores responses to web client requests until network conditions, and available bandwidth, permit transmitting the responses, e.g., the packets, from the transmit queue through the first network sub-part 106.

According to a preferred embodiment of the present invention, the first and second requests are received, serviced by the HTTP server application 204, and corresponding first and second packets constituting responses to the first and second requests, respectively, are stored in the transmit queue. These first and second packets are contemporaneously stored in the transmit queue within a time interval that is less than the time for a packet to move completely through the transmit queue, given the length of the queue at the time that the first packet is stored in the transmit queue. The time interval provides opportunity for combining packets, e.g., the first and second packets, being stored in the transmit queue and during the entire pendency of packets in the transmit queue.

In process blocks 406 and 408 first and second packets are prepared in response to the first and second requests received in process blocks 402 and 404, respectively. Each of the first and second packets includes a content payload that is the same in the first and second packets and further that constitutes at least a portion of the web content item requested by the first and second requests. Besides the content payload, the first packet includes 1) the first address to be used for identifying the first networked device in the network, and 2) a first request specific header. Likewise, besides the content payload, the second packet includes the second address to be used for identifying the second networked device in the network, and a second request specific header. The first and second request specific headers preferably include reliable unicast header information, e.g., TCP header information. The TCP header information is used for connection management purposes. Additionally, the TCP header information preferably provides per destination tracking information, e.g. for tracking the flow of data to a particular destination such as the first and second networked devices 122, 124, in the network.

Referring now to FIG. 4B, in process block 410 the first and second packets are determined to include in the payload of the packet the same portion of the web content item. Process block 410 is preferably broken into a number of sub-steps. Process block 410 is preferably performed by a queue scan program module that reads packets in a queue (e.g., the transmit queue 210A). According to a preferred embodiment of the present invention, the queue scan program module is preferably invoked when a packet is about to be added to the transmit queue. This queue scan program module attempts to find another packet that is already on the transmit queue and that has the same payload.

In one exemplary embodiment, the queue scan module first compares the payload size of a packet that is about to be added to the queue with the payload size of each packet that is already on the queue. If a packet on the queue has a different payload size it of course cannot have the same payload.

The queue scan module, according to a second exemplary embodiment, may compare a normalized or canonical checksum (described below) associated with the payload of the packet to be added to the transmit queue with that of packets already on the transmit queue. If the normalized checksum of the payload of the packet to be added is different from that of a packet already on the queue then it can be concluded that the packet to be added has a different payload.

The queue scan program module, according to a third exemplary embodiment, may perform a byte-by-byte comparison between the payload of the packet to be added and that of each packet already in the transmit queue. This byte-by-byte comparison is a very reliable way of determining a match between the payloads of packets. However, it is also the most time and resource consuming functional sequence for determining whether the payload in the packet to be added to the transmit queue matches the payload of one of the packets already in the transmit queue. Therefore, a more efficient approach is discussed below.

According to another alternative embodiment, the byte-by-byte comparison may preferably be limited to just those packets on the transmit queue that had matching normalized checksums as discussed above. Furthermore, checks for matching normalized checksums may be limited to packets that are found to have the same payload size. The latter tiered operational sequence of tests reduces the overall computational cost of finding a match between the payload of a packet to be added to the transmit queue and the payload of one of the packets already in the transmit queue.

According to an alternative embodiment of the invention, when each new packet that has been formed in response to a request, is received at a layer of the communication protocol stack at which the queue is maintained, it is immediately checked against packets already on the queue for matches.

If the queue scan module checks the queue for matches for each new packet that is to be added to the queue, and when a match is found forms a combined packet, then when the queue scan module finds a matching packet it need not search the queue further, because all other matching packets will have been combined in the packet that was found.

A TCP packet checksum varies as a function of TCP header information, even if the data carried by the TCP packet remains unchanged. For example two TCP packets that are addressed to two different destination, but carry the same data payload, will in general have different TCP checksums due to the fact that the destination addresses are different and because the TCP sequence numbers will in general be different on different connections. A normalized or canonical checksum that covers the payload but not the TCP header information can be obtained for comparison purposes by backing out the variable header data, from a computed check sum. According to one embodiment of the invention this is accomplished by recomputing a checksum based on the replacement of any variable data by one or more predetermined numbers. In one embodiment, the checksum is recomputed by applying the following formula for each variable data item:

$$HC' = \sim(\sim HC + \sim m + m')$$

where HC' is a canonical checksum that does not depend on variable data;

HC is a computed checksum that depends on variable header data;

m is the variable header data;

m' is a predetermined value to be used in lieu of the variable header data in computing the canonical checksum; and ~represents a ones complement operation.

The foregoing formula is presented in Request for Comment (RFC) number 1624, Computation of the Internet Checksum via Incremental Update, published by the Internet Engineering Task Force.

In process block 412 a next hop address for the first packet is determined, and in process block 414 the next hop address for the second packet is determined. In process block 416 it is determined that the next hop address for the first packet and the next hop address for the second packet are the same. The next hop address can be determined using information contained in a routing table stored in a memory accessible to the server 102. Some web servers have only one connection to the Internet. In the latter case, the steps of determining the next hop addresses for each packet 412, and 414, and the step of determining that the next hop addresses are the same 416 can be eliminated.

In process block 418 a third packet is composed that includes, according to a preferred embodiment of the present invention, 1) at least one address, e.g., the first address and the second address, and 2) information derived from the first and second request specific headers, and 3) a content payload that is the same as in the first and second packets. The information derived from the first and second request specific headers preferably comprises the first and second request specific headers themselves. More preferably, the first and second request specific headers are TCP headers used for tracking the flow of data to the first and second networked devices 122, 124, respectively. Preferably, this TCP header information can be used to construct a packet that can be handled by an ordinary unmodified web client and a conventional TCP/IP communication protocol stack. Alternatively, the information derived from the first and second request specific headers can be included in the third packet in a compressed form. At this point the third packet is stored in the transmit queue instead of storing the first and second packets. If either of the first and second packets were already stored in the transmit queue, then the particular packet is removed from the queue. According to a preferred embodiment of the present invention, the combined packet, i.e., the third packet, comprises a reliable multicast packet for distributing in the network.

In process block 420, the third packet is transmitted to the next hop address. The next hop address, according to an exemplary embodiment, identifies the network router 110 in the network. Thus, the size of the queue is reduced by replacing multiple packets by a single packet. Note that packets need not be consecutive to be combined. Note too that although two packets were combined into a single packet in the above example, it is possible for 3, 4, 5, or more packets to be combined to further reduce the size of the queue. The process of combining packets can continue during the entire pendency of the combination packet in the transmit queue until it is time to transmit the combination packet into the network.

In the above discussed example, packets were combined in the transmit queue of a network interface module. A main advantage of this embodiment is that no changes are required in the HTTP server (or other server) application software. Note, that the process of combining responses to requests can also be done at other levels in the web server software 200 (e.g., in modules 208, 206, or 204 in FIG. 2).

Note that in some Internet applications such as HTTP, a response to a single request can take the form of a plurality of response packets, each including different parts of a request item (e.g., image file). Under certain conditions such as when the data rate of a first TCP/IP connection differs from that of a second TCP/IP connection, some of the first few pairs of packets that are prepared in response to two requests for the same item of information may not be matched up because the interval between when they are prepared is longer than a queue wait period, yet for the same two requests, subsequent packets may be matched up. In effect one connection catches up to the second.

Figure 5:
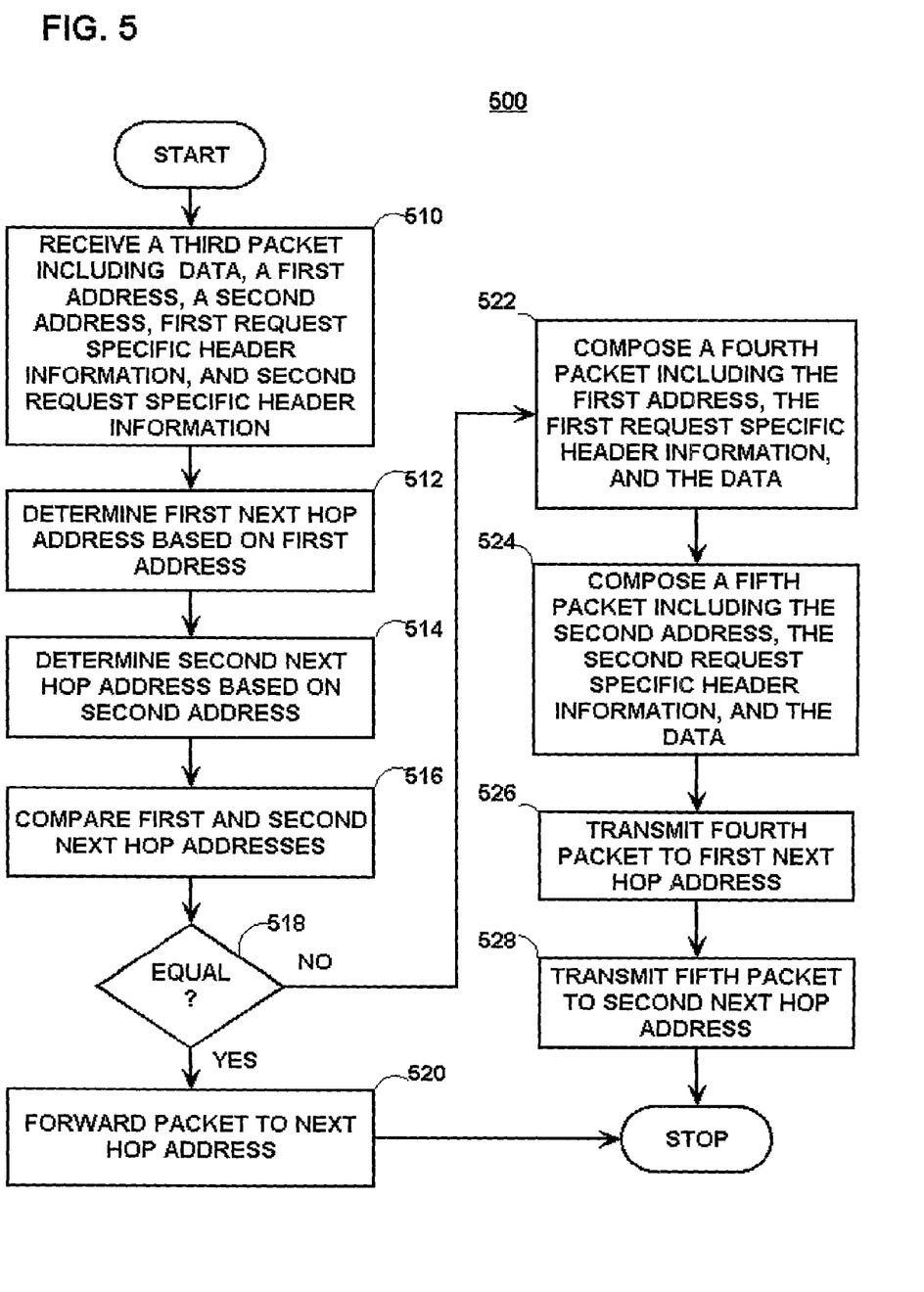
FIG. 5 is a flow diagram of a process performed by a network router according to a preferred embodiment of the invention.

FIG. 5 is a flow diagram of process 500 performed by a network router 110 according to a preferred embodiment of the present invention. In process block 510, a third packet (e.g., the third packet transmitted in process block 420) is received by the router 110. The third packet, according to one preferred embodiment of the present invention, includes a data payload (e.g., the portion of the web content item), a first address, a second address, a first request specific header (e.g., TCP header) and a second request specific header (e.g., a second TCP header). Although, in the interest of clarity in illustrating the invention, the discussion here is in terms of a third packet having a first and second address, the third packet can include any number of addresses and corresponding request specific headers.

In process block 512, according to this exemplary operational sequence, a next hop address is determined based on the first address, and in process block 514 a second next hop address is determined based on the second address. In process block 516, the first and second next hop addresses are compared. Process block 518 is a decision block, the outcome of which depends on whether the first and second next hop addresses are equal. If so, then the process continues with process block 520, in which the third packet is forwarded to the next hop address. (This assumes that the third packet did not contain additional addresses that correspond to a different next hop. If other such addresses were present, then another packet would need to be generated based on the other addresses for transmission to the respective next hop addresses.)

If the first and second next hop addresses are not the same, then the process continues with process block 522, in which a fourth packet including the first address, the first request specific header information and the data payload is composed. Following process block 522, in process block 524, a fifth packet including the second address, the second request specific header information, and the data is composed. In process block 526 the fourth packet is transmitted to the first next hop address, and in process block 528 the fifth packet is transmitted to the second next hop address.

In the example discussed above there were two destination addresses in the packet received by the router 110. If there were more than two addresses, the processing of the received packet would likely be as follows. The router would determine a next hop address for each of the destinations, and then partition the destinations based on their next hops. The router 110 would send to each next hop a packet that contains the data payload from the original packet, the list of destinations that correspond to that next hop, and the request specific header information for those destinations.

Based on the content of the forwarding table 310A a determination can be made as to whether or not the next hop is the final destination. If the next hop is the final destination then the next hop address corresponding to the destination address will be the destination address itself. If a next hop addresses corresponds to a final destination, e.g., a requesting network device, such as first client computer 124 or second client computer 122, then the packet to be sent to the destination is composed in a format suitable for receipt by the destination. Preferably the packet is composed as a reliable unicast packet i.e., a packet that includes information for a reliable unicast header, e.g., a checksum, window size, and a sequence number used in a reliable connection, e.g., a TCP connection. More preferably, the packet is composed as a normal TCP/IP HTTP packet expected by a web client application (e.g., Netscape Navigator running over a TCP/IP communication protocol stack.). That is to say that any formatting used to encode multiple destination addresses and multiple TCP headers in the packet would be removed. The resulting packet would include a single TCP header for the final destination.

If the number of destinations for a next hop is one, even if the next hop address is not the destination address, according to the preferred embodiment, the packet is preferably composed in a format suitable for receipt by the final destination. Alternatively, the packet can be forwarded without conversion.

Figure 6:
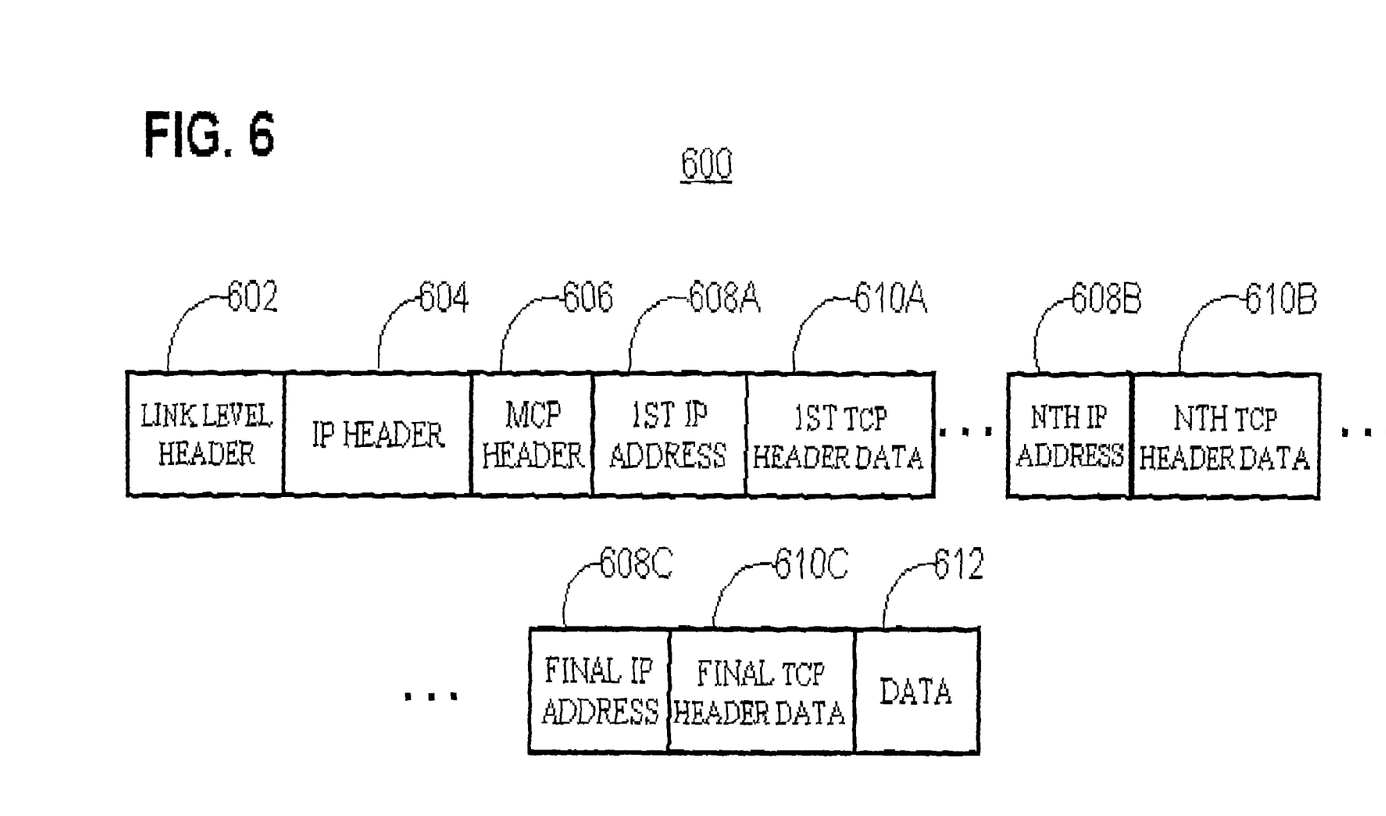
FIG. 6 is a schematic representation of a packet according to a preferred embodiment of the invention.

FIG. 6 is a schematic representation of a packet 600 according to a preferred embodiment of the present invention. Packet 600 indicates an exemplary form for the third packet composed in process block 418, and received in process block 510, according to a preferred embodiment of the invention. Although the third packet was discussed above as including two addresses, the packet can include two or more addresses as shown in FIG. 6. The packet includes a link layer header 602 (e.g., an Ethernet header) and an optional IP header 604. The optional IP header 604 is useful for tunneling the packet 600 through existing technology routers, that do not support the present invention, to a router 110 such as shown schematically in FIG. 3 that is capable of carrying out the process 500 illustrated in FIG. 5. A reliable multi-cast protocol header 606 is followed by a plurality of pairs of destination IP addresses 608A, 608B, and 608C, and corresponding request specific reliable unicast header information parts 610A, 610B, and 610C, preferably including TCP header information. The packet, in this example, further includes a data payload 612 that preferably includes a portion of the web content item.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of delivering information to multiple networked devices, the method comprising the steps of:

receiving a first request for a first item of information from a first networked device, the first request requesting the first item of information to be delivered to the first networked device as an ordinary unicast packet;

receiving a second request for at least a part of the first item of information from a second networked device, the second request requesting the at least a part of the first item of information to be delivered to the second networked device as an ordinary unicast packet; and forming a combined packet, in response to the first request from the first networked device and the second request from the second networked device, the combined packet comprising a reliable multicast packet including a packet header comprising a first network address used for the first networked device, a second network address used for the second networked device, and the combined packet further comprises a data payload that includes at least a part of the first item of information, for delivering the data payload to multiple networked devices, wherein the at least part of the first item of information included in the data payload being destined for reception by the first networked device in a first ordinary unicast packet, and further wherein the at least part of the first item of information included in the data payload being destined for reception by the second networked device in a second ordinary unicast packet.

2. The method according to claim 1 further comprising the steps of:
   in response to receiving the first request, forming a first packet including the first network address and a first data payload;
   in response to receiving the second request, forming a second packet including the second network address, and a second data payload;
   determining that the first packet and the second packet both include the data payload; and thereafter performing the step of forming a combined packet.

3. The method according to claim 2 wherein the step of determining that the first packet and the second packet both include the data payload comprises the sub-step of:
   comparing a byte size of the first packet to a byte size of the second packet.

4. The method according to claim 2 wherein the step of determining that the first packet and the second packet both include the data payload comprises the substeps of:
   computing a cannonical checksum for the first packet;
   computing a cannonical checksum for the second packet; and
   comparing the cannonical checksum for the first packet to the canonical checksum for the second packet.

5. The method according to claim 2 wherein the step of determining that the first packet and the second packet both include the data payload comprises the sub-step of:
   performing a byte-by-byte comparison of the data payload of the first packet to the data payload of the second packet.

6. The method according to claim 2 wherein the step of determining that the first packet and the second packet both include the data payload comprises the sub-steps of:
   computing a canonical checksum for the first packet;
   computing a canonical checksum for the second packet;
   comparing the canonical checksum for the first packet and the canonical checksum for the second packet; and
   in the case that the canonical checksum for the first packet matches the canonical checksum for the second packet performing a byte-by-byte comparison of the data payload of the first packet and the data payload of the second packet.

7. The method according to claim 2 wherein the step of determining that the first packet and the second packet both include the data payload comprises the sub-step of
   reading at least a part of one of the first packet and the second packet from a packet queue.

8. The method according to claim 2 further comprising the steps of:
   determining a first next hop destination for the first networked device;
   determining a second next hop destination for the second networked device; and
   determining that the first next hop destination is the same as the second next hop destination, and thereafter performing the step of forming a combined packet.

9. The method according to claim 2 wherein the step of determining that the first packet and the second packet both include the data payload comprises the sub-steps of:
   comparing a byte size of the first packet to a byte size of the second packet; and in the case that the byte size of the first packet matches the byte size of the second packet:
   computing a canonical checksum for the first packet;
   computing a canonical checksum for the second packet; and
   comparing the canonical checksum for the first packet and the canonical checksum for the second packet.

10. The method according to claim 9 wherein the step of determining that the first packet and the second packet both include the data payload comprises the sub-step of:
    in the case that the canonical checksum for the first packet matches the canonical checksum for the second packet, performing a byte-by-byte comparison of the data payload of the first packet and the data payload of the second packet.

11. The method according to claim 2 wherein the step of determining that the first packet and the second packet both include the data payload comprises the sub-steps of:
    comparing a byte size of the first packet to a byte size of the second packet; and
    in the case that the byte size of the first packet matches the byte size of the second packet, performing a byte-by-byte comparison of the data payload of the first packet and the data payload of the second packet.

12. The method according to claim 1 wherein the step of receiving a first request for a first item of information comprises a sub-step of:
    receiving a request for web content.

13. The method according to claim 12 wherein the step of receiving a request for web content includes the sub-step of:
    receiving an http request.

14. The method according to claim 1 wherein the step of forming a combined packet includes the sub-steps of:
    adding to the combined packet a first reliable unicast header part associated with the first network address used for the first networked device; and
    adding to the combined packet a second reliable unicast header part associated with the second network address used for the second networked device.

15. The method according to claim 14 wherein:
    the sub-step of adding to the combined packet a first reliable unicast header part comprises the sub-step of adding to the combined packet a first TCP header information part associated with the first network address; and
    the sub-step of adding to the combined packet a second reliable unicast header part comprises the sub-step of adding to the combined packet a second TCP header information part associated with the second network address.

16. A method of relaying a packet in a network, the method comprising the steps of:
    receiving a data content part of a first packet, the first packet comprising a reliable multicast packet;
    receiving a first destination network address part of the first packet, wherein the first destination network address is used for a first networked device;
    receiving a second destination network address part of the first packet, wherein the second destination network address is used for a second networked device;
    receiving a first reliable unicast header part of the first packet that corresponds to the first destination network address;
    receiving a second reliable unicast header part of the first packet that corresponds to the second destination network address; forming a packet including the data content part of the received first packet; and sending the formed packet to a next hop in the network.

17. The method according to claim 16 wherein the step of receiving the first reliable unicast header part comprises the sub-step of:
  receiving a first TCP header.

18. The method according to claim 16 further comprising the steps of:
  determining a first next hop address based on the first destination network address; and determining a second next hop address based on the second destination network address.

19. The method according to claim 18 further comprising the steps of:
  comparing the first next hop address to the second next hop address; and
  in the case that the first next hop address is equal to the second next hop address, forwarding the first packet to the first next hop in a network.

20. The method according to claim 18 further comprising the steps of:
  comparing the first next hop address to the first destination network address; and
  in the case that the first next hop address is equal to the first destination network address, composing a reliable unicast packet including the data content part of the first packet, the first destination network address part of the first packet, and the first reliable unicast header part of the first packet.

21. The method according to claim 18 further comprising the steps of:
  comparing the first next hop to the second next hop; and
  in the case that the first next hop is not equal to the second next hop,
    forming a second packet including the data content part of the first packet, the first reliable unicast header part of the first packet, and first destination network address of the first packet;
    sending the second packet to the first next hop;
    forming a third packet including the data content part of the first packet, the second reliable unicast header part of the first packet, and the second network destination address of the first packet; and
    sending the third packet to the second next hop.

22. The method according to claim 20 wherein the step of composing a reliable unicast packet comprises the sub-step of:
  forming a unicast TCP/IP packet including the data content part of the first packet, first destination network address part of the first packet, and information derived from the first reliable unicast header part of the first packet.

23. A method of relaying a packet in a network, the method comprising the steps of:
  receiving a packet that includes a data content part, a plurality of destination addresses, and a plurality of reliable unicast header parts corresponding to the plurality of destination addresses;
  separating the plurality of destination addresses and the corresponding plurality of reliable unicast header parts into a set of groups each of which corresponds to a next hop address; and
  composing a set of packets, each of which includes a group of at least one reliable unicast header part and corresponding at least one destination address, and each packet corresponding to a next hop address.

24. The method according to claim 23 wherein the step of composing the set of packets includes the sub-step of
  composing one or more unicast packets.

25. The method according to claim 24 wherein the sub-step of composing one or more unicast packets comprises a sub-step of:
  composing a TCP/IP packet.

26. A network device comprising:
  a comparator for comparing an item of information associated with a first destination network address with an item of information associated with a second destination network address;
  a packet merger for combining the first destination network address, the second destination network address, and the item of information in a packet comprising a reliable multicast packet, the reliable multicast packet including a packet header comprising the first destination network address and the second destination network address, wherein the item of information is to be received at the first destination network address in a first ordinary unicast packet and at the second destination network address in a second ordinary unicast packet; and
  a network interface for transmitting the packet.

27. A network device comprising:
  a packet parser for receiving a packet and extracting data, and a plurality of destination addresses, a plurality of reliable unicast header parts corresponding respectively to the plurality of destination header addresses; and
  an associater for determining next hop addresses based on the plurality of destination addresses, and associating together destination addresses, and reliable unicast header parts that correspond to a common next hop address.

28. The network device according to claim 27 further comprising:
  a new packet composer for composing a packet including destination addresses, and reliable unicast header parts that correspond to the common next hop address.

29. A computer readable medium containing programming instructions for distributing information over a network, the computer readable medium including programming instructions for:
  receiving a first request for a first item of information from a first networked device, the first request requesting the first item of information to be delivered to the first networked device as an ordinary unicast packet;
  receiving a second request for at least a part of the first item of information from a second networked device, the second request requesting the at least a part of the first item of information to be delivered to the second networked device as an ordinary unicast packet; and
  forming a combined packet, in response to the first request from the first networked device and the second request from the second networked device, the combined packet comprising a reliable multicast packet including a packet header comprising a first network address used for the first networked device, a second network address used for the second networked device, and the combined packet further comprises a data payload that includes at least a part of the first item of information, for delivering the data payload to multiple networked devices, wherein the at least part of the first item of information included in the data payload being destined for reception by the first networked device in a first ordinary unicast packet, and further wherein the at least part of the first item of information included in the data payload being destined for reception by the second networked device in a second ordinary unicast packet.

30. A computer readable medium containing programming instructions for relaying a packet in a network, the computer readable medium including programming instructions for:
- receiving a data content part of a first packet, the first packet comprising a reliable multicast packet;
- receiving a first destination network address part of the first packet, wherein the first destination network address is used for a first networked device;
- receiving a second destination network address part of the first packet, wherein the second destination network address is used for a second networked device;
- receiving a first reliable unicast header part of the first packet that corresponds to the first destination network address;
- receiving a second reliable unicast header part of the first packet that corresponds to the second destination network address; forming a packet including the data content part of the received first packet; and sending the formed packet to a next hop in the network.

31. The computer readable medium according to claim 30 further comprising programming instructions for:
- determining a first next hop address based on the first network destination address; and
- determining a second next hop address based on the second network destination address;
- comparing the first next hop to the second next hop;
- in the case that the first next hop is not equal to the second next hop,
- forming a second packet including the data content part of the first packet, the first reliable unicast header part of the first packet, and first network destination address;
- forwarding the second packet to the first next hop address;
- forming a third packet including the data content part of the first packet, the second reliable unicast header part of the first packet, and the second network destination address; and
- forwarding the third packet to the second next hop address.

32. A method in a network server for distributing information over a network, the method comprising the steps of:
- receiving a first request for a first item of information from a first networked device associated with a first TCP header information;
- receiving a second request for the first item of information from a second
- networked device associated with a second TCP header information;
- providing a combined packet including
  - at least one address information corresponding to the first networked device and the second networked device,
  - the first TCP header information and second TCP header information, and
  - a data payload that includes at least a part of the first item of information being requested by the first networked device and by the second networked device; and
- sending the combined packet into the network.

33. The method of claim 32, wherein the combined packet comprises a reliable multicast packet.

* * * * *